3,591,457
ENZYMATIC DECOMPOSITION OF GLUCANS
Hans Bender, Freiburg im Breisgau, and Harald Metz, Darmstadt, Germany, assignors to E. Merck A.G., Darmstadt, Germany
No Drawing. Continuation of abandoned application Ser. No. 462,739, June 9, 1965. This application Sept. 13, 1968, Ser. No. 760,127
Claims priority, application Germany, June 11, 1964, M 61,327
Int. Cl. C12d 1/00
U.S. Cl. 195—33        7 Claims

ABSTRACT OF THE DISCLOSURE

The decomposition of β-glucans, particularly native cellulose, by subjecting same to the activity of *Oxyporus populinus*, the culture filtrate thereof, a mycelium extract thereof, or an enzyme produced therefrom, thereby producing such decomposition products as glucose and cellobiose.

---

This is a continuation of application Ser. No. 462,739 filed June 9, 1965 and now abandoned.

The present invention relates to a process for the decomposition of β-glucans (a glucan is a polysaccharide forming glucose on hydrolysis), particularly cellulose, by microorganisms or by enyzme preparations produced therefrom.

The ability to decompose cellulose and other β-glucans has been noted in numerous microorganisms or enzymes produced from such micoorganisms (for example cellulases). However, because of a number of practical limitations, only a minor utilization of such cellulases has been made industrially—in the pharmaceutical or in the paper industry, for example. Thus, the previously known cellulose preparations exhibit little or no activity upon native celluloses, such as cotton, paper, etc. In most cases, the cell-free filtrates obained from cultures of even those strains which can beneficially utilize native cellulose as a carbon source, show poor activity with respect to the native substrate. Of a total of abou 90 cellulase preparations of different fungoid origin, only about 10 showed an activity upon cotton linters, and only about 5 showed such activity upon filter paper, but generally only after a longer period of exposure under optimal conditions. Furthermore, very long cultivation times are required for maximal yields—in the literature statements can be found indicating a time of between 7 and 40 days. Finally, several of the cellulose-decomposing fungi, for example the Basidiomycetes, cannot be readily cultivated in submerged condition, these Basidiomycetes being known to destroy wood.

A pricipal object of this invention, therefore, is to provide an improved process for the decomposition of β-glucans, particularly cellulose.

Upon further study of the specification and claims, other objects and advantages of the present invention will become apparent.

These objects are attained on our findings that the use of Basidiomycetes of the genus Oxyporus substantially avoids the disadvantages attendant to prior art processes, and that cell-free filtrates derived from cultures of these fungi exhibit a higher cellulolytic activity than filtrates derived from microorganisms heretofore known to be cellulose-decomposing. Not only acid swollen or alkali-swollen celluloses or cellulose derivatives, such as carboxymethyl cellulose, are attacked, but also cellulose powders, filter paper, and cotton. Fungi of the genus Oxyporus previously were not used for cellulose decomposition. The strains are readily cultivatable in submerged condition, also in the fermenter. They grow well in defined or ordinary undefined nutrient solutions and reach the maximum of their cellulolytical activity after a short cultivation period.

In brief, then, the process of this invention comprises subjecting β-glucans, particularly cellulose, to the cellulolytic fermentative activity of fungi of the genus Oxyprous (Bourd & Galzin) Donk. This can be accomplished, of course, by subjecting the β-glucan to the activity of the microorganism, the culture filtrate thereof, a mycelium extract thereof, or an enzyme produced therefrom.

Particularly advantageous is the use of the species *Oxyporus populinus* (Schum, ex Fr.) Donk, syn. *Fomes connatus* (Fr.) Gillet, *Polyporus connatus* Fr., *Polystictus connatus* (Fr.) Quél. (in the following designated briefly as "*O. populinus*"), as this species forms chlamydo spores in saprophytic culture. Because of this, the cultivation is rendered simpler and safer.

In addition to a cellulose, other β-glucans can be decomposed by the process of this invention, for example lichenin or yeast cell walls containing 1,3-connected β-glucans.

The final products produced from the β-glucan decomposition of this invention include glucose and cellobiose, but no attempts have been made to determine the nature of the other degradation products in detail.

The fungi are preferably grown in malt extract-peptone nutrient solutions, for example with a content of 2.0% malt extract and 0.02% peptone (pH 5.8). When using solid nutrient substrata, 2% agar-agar is added.

Likewise, synthetic solutions having a readily utilizable carbon source are entirely suitable for the stock culture, for example, a solution having the following composition:

TABLE I

Glucose—1.0%
l-asparagine—0.05%
$KH_2PO_4$—0.2%
$Ca(NO_3)_2$—0.2%
$MgSO_4 \cdot 7H_2O$—0.05%
$FeCl_3$—0.8 mg./liter.
$ZnSO_4 \cdot 7H_2O$—0.9 mg./l.
$MnSO_4 \cdot H_2O$—0.4 mg./l.
Thiamine hydrochloride—1.0 mg./l. (pH 5.5)

In place of glucose, there can also be employed maltose, sucrose, cellulose powder, acid-swollen or alkali-swollen cellulose powder. The initial cultivation of the stock and inoculum cultures is conducted, in case of *O. populinus*, approximately 8 days at about 28° C. Thereafter, the larger portion of the mycelium has formed lemon-shaped chlamydospores; the residual vegetative hyphae are autolyzed.

The submerged cultivation of the fungi in the above-mentioned media is conducted in agitated flasks or in a fermenter. After four days of breeding at 28° C., 3–5 g. mycelium per liter (on a dry weight basis) are formed in the abovementioned nutrient solutions.

For the synthesis of the cellulolytic system, the presence of cellulose is necessary in the nutritive medium. An optimal cellulolytic activity is found in the culture filtrate after a three or four day duration of cultivation at about 28° C., if the cultivation is conducted according to the following scheme:

(a) Stock culture on malt extract-peptone-agar.
(b) Seed culture(s) on malt extract-peptone nutrient solution and/or with the abovementioned defined nutrient solution (Table I) but with acid-swollen cellulose as carbon source, 3 to 8 days.

(c) Main culture, preferably with a nutrient solution of the following composition (3 to 4 days):

TABLE II

Cullose powder—0.3%
Casein hydrolyzate—0.2%
Cornsteep powder—0.04%
$KH_2PO_4$—0.2%
$MgSO_4 \cdot 7H_2O$—0.05%
$FeSO_4 \cdot 7H_2O$—1.0 mg./l.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

The following examples describe the cellulolytic activity of the culture filtrate obtained from *O. populinus*. This culture filtrate is produced by the following method:

Stock cultures of *O. populinus* are grown at 28° C. on agar slants of 2% malt extract, 0.02% peptone, and 2% agar-agar. After 16 days, these slants are floated with sterile water and used for seeding shaking flasks (1 ltr. Erlenmeyer flasks) containing 200 ml. of a malt extract-peptone solution each. The seeded flasks are incubated on a shaking machine for 3 days at 28° C. A stainless steel laboratory fermenter containing 10 ltrs. of a sterile nutrient solution according to Table II is seeded with 400 ml. of this shaking culture. The culture grows at 28° C. with stirring and aeration. After 12 hours, when the culture has reached its maximal activity, the mycelium is separated by filtration and the clear filtrate is used for the degradation of cellulose according to the following examples.

Example 1

The culture filtrate is concentrated to ⅕ of its original volume and adjusted to a pH of 4.6. 500 mg. cellulose powder are kept at 35° C. in 100 ml. of the thus-obtained solution for 48 hours. Thereafter, the residual cellulose is centrifuged, dried, and weighed: 234 mg.=46.8% originally weighed-in quantity. 53.2% of the original weight have thus been decomposed under these conditions.

Example 2

500 mg. acid-swollen cellulose powder are treated as in Example 1. Final weight: 42 mg.=8% of the originally weighed-in quantity; 92% of the initial weight are decomposed.

Example 3

500 mg. filter paper are treated as in Example 1. Final weight: 293 mg.=58.6% of the originally weighed-in quantity; 41.4% of the initial weight are decomposed.

Example 4

A cotton thread of a length of 8 cm. and a weight of 23 mg. is pretreated with a 32% sodium hydroxide solution at room temperature for 10 minutes. After thorough washing, the thread is then placed, for 24 hours at 40° C., in 100 ml. fresh culture filtrate, and subsequently the decrease in tear resistance is determined. The thus-treated thread ruptures at a load of 10 g., while a control thread, which was likewise pretreated with sodium hydroxide solution in the same manner but not exposed to the culture filtrate, tears at a load of 500 g.

Example 5

70 mg. cotton, pretreated with 32% aqueous sodium hydroxide solution, are kept at 40° C. for 24 hours in a mixture of 10 ml. fresh culture filtrate (pH 5.4) and 90 ml. water. Final weighed quantity: 55 mg.=78% of the originally weighed-in quantity; 22% of the initial weight are decomposed.

Similar results are obtained by repeating the preceding examples, but instead of a culture filtrate, using a mycelium extract or enzyme of *O. populinus* produced by conventional methods as described, for instance, in L. A. Underkofler and R. J. Hickey, Industrial Fermentations, vol. II (Chemical Publishing Co. Inc., New York, 1954) or F. C. Webb, Biochemical Engineering (D. van Nostrand Co., Ltd., London 1964).

The enzyme can be extracted from the mycelium with, for instance, phosphate buffer solution (pH 5.0).

According to the above references, enzymes are generally precipitated from solution by the addition of alcohol, acetone, or saturated ammonium sulfate.

Aside from processes based on the fermentation action of *O. populinus*, the preceding examples can be repeated with other fungi of the genus Oxyporus (Bourd & Galzin) Donk such as, for example, *Oxyporus obducens* (Pers.) Donk.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A composition of matter free of mycelia and tissue comprising an enzyme, having a high cellulolytic activity for native cellulose, said enzyme being elaborated from *Oxyporus populinus* by cultivating the latter in an aqueous nutrient solution containing cellulose and separating the enzyme from the fungus.

2. An aqueous solution having a pH of about 4.6 and dissolved therein a composition as defined by claim 1.

3. A process which comprises the step of subjecting a β-glucan selected from the group consisting of acid-swollen cellulose, alkali-swollen cellulose, carboxymethyl cellulose, cellulose powders, filter paper and cotton to the fermentative cellulolytic activity of a submerged aerated culture of fungus of the species *Oxyporus populinus*, said culture having been grown in the presence of cellulose as a nutrient.

4. A process which comprises the step of subjecting a β-glucan to the fermentative cellulolytic activity of the cellulolytic aqueous solution of an enzyme elaborated from a fungus of the species *Oxyporus populinus* produced by cultivating the latter in aqueous nutrient solution containing cellulose, said aqueous solution of enzyme being essentially free of said fungus.

5. A process as defined by claim 4 wherein said aqueous solution is a culture filtrate.

6. A process as defined by claim 4 wherein said β-glucan consists essentially of native cellulose.

7. A process as defined by claim 5 wherein said β-glucan consists essentially of native cellulose.

References Cited

Mycologia, vol. 46, p. 121 (1954).

Ragaswami et al.: Indian Journal of Microbiology, vol. III, No. 4, pp. 139–142 (1963).

Rees: Enzymic Hydrolysis of Cellulose and Related Materials pp. 209–217 (1963).

Thaysen et al.: The Microbiology of Cellulose, Hemicellulose, Pectin and Gums, p. 301 (1927).

ALVIN E. TANENHOLTZ, Primary Examiner

U.S. Cl. X.R.

195—8, 62, 66